*INVENTORS*
LYLE R. BOARTS
CARL W. ANDERSON
BY

*William R. Lane*

ATTORNEY

*INVENTORS*
*LYLE R. BOARTS*
*CARL W. ANDERSON*

ATTORNEY

Patented May 11, 1954

2,678,015

UNITED STATES PATENT OFFICE 2,678,015

MEANS FOR DRAW FORMING

Carl W. Anderson, Los Angeles, and Lyle R. Boarts, Manhattan Beach, Calif., assignors to North American Aviation, Inc.

Application May 25, 1950, Serial No. 164,096

3 Claims. (Cl. 113—44)

This invention relates to improvements in metal forming technique. It provides means for controlling the flow and displacement of excess material tending to form wrinkles and the like exhibited by metal parts formed by conventional die forming methods.

More particularly the invention provides positive means for obtaining finished contoured metal parts completely formed in one operation.

Prior to this invention it has been standard practice in the aircraft industry to shape and contour a considerable number of aircraft component parts by rubber forming methods. For this purpose the hydropress, which utilizes rubber forming pressure, is widely favored in the industry due to the relatively small cost of tooling involved.

The principal disadvantages connected with the hydropress rubber forming method used prior to this invention is that metal parts obtained thereby are seldom formed without exhibiting certain forms of surface wrinkles created by the accumulation of excess materials, or ruptures in the edges introduced by severe-stretching forces acting along the sensitive edges of the flanges. As a consequence it is necessary to transfer hydropress formed parts to hand forming fixtures, whereupon wrinkles and the like are ironed out by hand finishing operations. In an endeavor to eliminate the excessive amount of handwork required to complete sheet metal parts formed on the hydropress, various tooling arrangements have been attempted, including devices such as hinge plates, draw rings, cover plates, and a method of stacking additional hard rubber pads on or around the hydro rubber forming dies. While all of these various methods were undertaken to eliminate the formation of wrinkles on parts formed in a hydropress, they were all more or less limited to some extent to the production of certain types of parts.

The hinge plate arrangement requires considerable maintenance and is adapted primarily to impress joggles in the flanges of former ribs, bulkheads, and the like.

Draw rings are limited to parts of mild contour having 90° flanges. In addition, a draw ring has to encircle the die or be guided by liner pins.

The greatest difficulty experienced with cover plates is the inability of the operator to remove the part from the die after forming. Cover plates are only capable of partially completing mild contours on lighter gauge material.

The aforementioned unsatisfactory methods are now effectively eliminated by the use of this invention.

Accordingly, it is an object of this invention to provide means for forming sheet metal parts in one operation having curved, stretch or shrink type flanges.

It is also an object of this invention to provide means for forming in one operation, on conventional hydro rubber forming dies, contoured sheet metal parts having curved open or closed angle flanges.

It is another object of this invention to provide means for preventing the formation of wrinkles in open or closed angle flanges of sheet metal parts formed on conventional hydro rubber forming dies.

It is yet another object of this invention to provide means for obviating the formation of wrinkles by engaging between the spaced plate arrangement of a draw form clip the edges of the sheet metal blank ordinarily formed on conventional hydro rubber forming dies.

It is still another object of this invention to provide means for producing sheet metal parts on a hydropress wherein the edges of the sheet metal blank are engaged between a spaced plate arrangement of a draw form clip constructed to restrict the flow of metal tending to produce wrinkles or cracks in the sensitive edges of the blank during the forming operation.

Other objects and advantages of this invention will hereinafter appear and, for purposes of illustration but not of limitation, an embodiment of the invention is shown on the accompanying drawings, in which Fig. 1 is a side elevation partially in section showing the draw form clip applied to blank on die in a hydropress;

Figure 1:
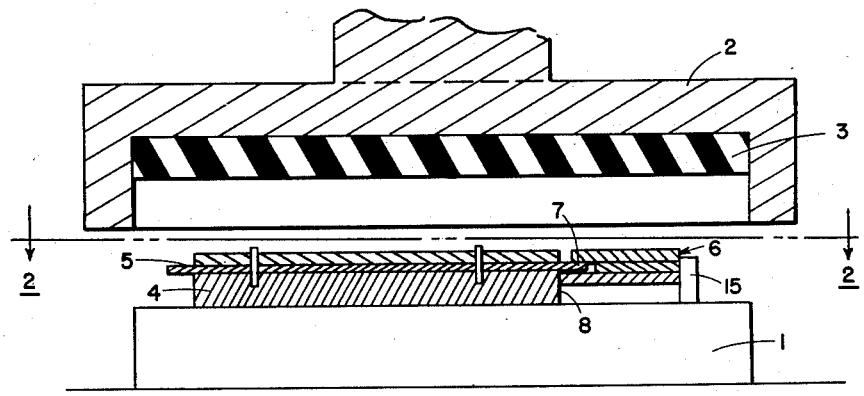

Referring to the drawings, Fig. 1 illlustrates a typical hydropress forming set-up arranged in accordance with the application of this invention comprising a bed 1, an upper movable platen 2 encasing a thick rubber pad 3, a forming die 4, a sheet metal blank 5, and a draw form clip 6 suspended on flange portion 7 of blank 5.

Figure 9:
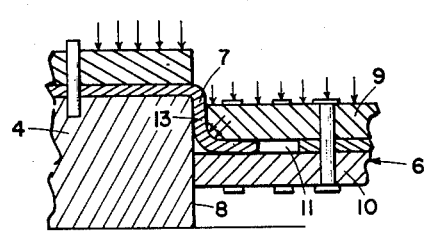
Fig. 9 is a sectional view showing the application of the forces to the blank during the forming operation.

In operation the movable platen 2 is brought in contact with the forming die 4 allowing rubber pad 3 to exert a uniform downward pressure on draw form clip 6. As the draw form clip 6, Fig. 4, moves parallel to face 8 of die 4, the flange 7 engaged between spaced plates 9 and 10 is gradually withdrawn from the slot 11 until the clip 6 has moved downward along face 8 a distance equal to the thickness of plate 9 whereupon the withdrawn portion of the flange 7 conforms to the radius 12 of plate 9, Fig. 9 to fill space 13 which is equal to the thickness of the flange 7. Plate 9 of draw form clip 6 acts as a pressure plate to wipe flange 7 against the face 8 of die 4. The portion of flange 7 contained between plates 9 and 10 is prevented from wrinkling by reason of the wiping action of the vertical face of plate 9 which works effectively against the contoured surface of die 4. Although vertical forces only are exerted by member 2, nevertheless portion 12 of plate 9 exercises lateral pressure upon flange 7 to wipe it against face 8 of die 4 by reason of its curved portion 12. Plate 10 engages and is guided by face 8 of die 4. The resolution of forces is such that clip 6 is held in forming and wiping position. There may be provided a guide 15, as shown in Fig. 1, if so desired, to prevent lateral movement of the clip during the forming operation.

When this draw clip is used without a guide the operation is such that the downward movement of rubber pad 3 will, upon contact with the clip, first force the free outer edge of the clip into contact with bed 1, following which the edge adjacent to the die is moved downwardly along face 8 of the die. Upon reaching the bed the outer edge of the clip will slide outwardly along the bed a sufficient distance to allow the inner edge to travel downwardly in contact with the die, rubber pad 3 preventing any further lateral movement of the clip. To facilitate the movement of the clip relative to the die the bottom portion of the edge of the clip below slot 11 may be provided with a radius, chamfer or otherwise cutaway or recessed portion. A clip for use without a guide must of course be of sufficient width so that the clip will remain relatively close to the horizontal during its action, thus enabling the outer edge to slide smoothly outward after contact with bed 1. A narrow clip would be inclined downwardly at a more acute angle and might catch on the bed so as to preclude outward movement of the outer edge of the clip, thus preventing the downward drop of the inner edge of the clip. When used without a guide the contour of the outer edge of the clip is immaterial to its operation and may be roughly cut by any convenient method when the clip is formed, which results in a great saving in expense and time required in producing the clips.

Figure 2:
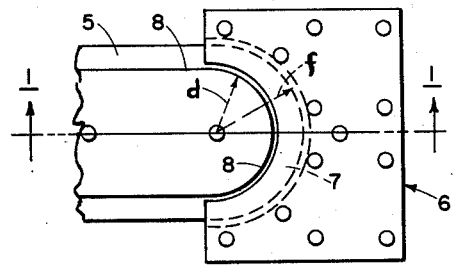
Fig. 2 is a top plan view of conventional hydro rubber forming die blank and draw form clip applied to a convex flange portion of a part.
Figure 3:
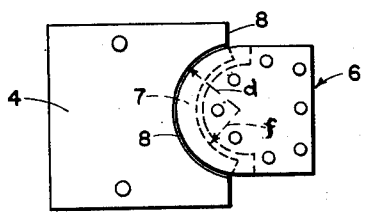
Fig. 3 is a top plan view of the same as Fig. 2, showing draw form clip applied to a concave flange portion of a part.

When a clip of the type of Fig. 2 or Fig. 3 is used, the pivotal axis, as the free outer edge is forced downwardly, is near the extremity of the edge of the clip adjacent the die. No undue working of the part results from draw forming with these clips. In the case of the modification of Fig. 7, the tilting action of the clip as it is forced downwardly may be less pronounced due to the fact that the die may serve to some extent as a guide for the clip. Nevertheless with the draw clips of this invention normally employed, such as illustrated in Figs. 2 and 3, the action is as described above.

In the case of a curved shrink flange, such as the type shown in Fig. 2, it can be seen that the radius $f$ of the outer curved edge of flange 7 is larger than the radius $d$ of the curved edge of face 8 of die 4. Since flange 7 must conform to the smaller radius of the die face 8 in the formed position, wrinkles will develop in the outer edge of flange 7 due to displacement of excess material unless lateral forces are brought to bear for the prevention thereof.

In the case of a stretch type flange, as shown in Fig. 3, the radius of curvature $f$ of the outer edge of flange 7 is less than the radius of curvature $d$ of the face 8 of die 4. Thus, converse to the shrink type flange, the outer edge of flange 7 must stretch to conform to the larger radius of curvature of face 8 of die 4. Unless positive means are taken to draw or cause flow of the material outward from the inner portion to the outer edge of flange 7, cracks or tears will appear in the sensitive edge.

The foregoing covers in brief the difficulties experienced in conventional hydropress forming procedures. Without the use of the draw form clip, as exemplified above, the rubber pad 3 (Fig. 1) in plate 1 cannot exert the lateral forces sufficient to maintain the flange portion 7 of blank 5 in a flat plane during the forming operation. Therefore, wrinkles or cracks invariably form in sheet metal parts having curved flanges if drawn to a depth of ½ inch or more, depending upon the degree of curvature.

Figure 4:
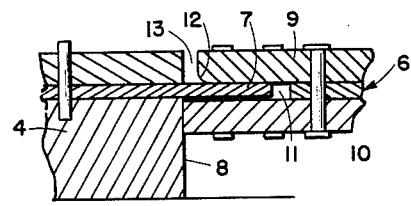
Fig. 4 is an enlarged detail in section showing design of the draw form clip.
Figure 5:
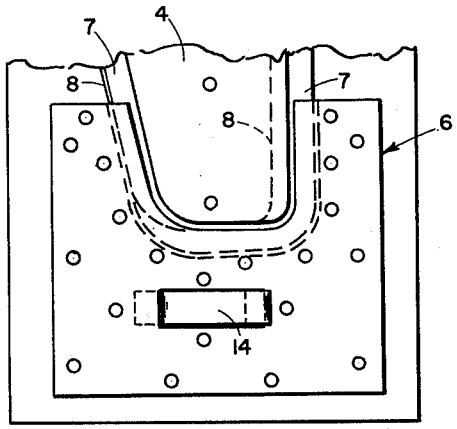
Fig. 5 is a modified type of draw form clip for forming open and closed angle flanges with cam block attachment.
Figure 6:
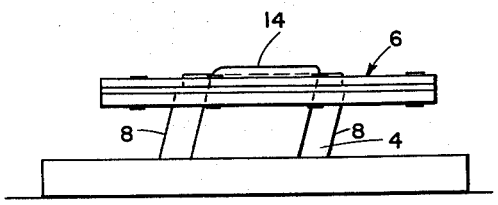
Fig. 6 is an end view in elevation of Fig. 5.

By the use of applicants' invention, the draw form clip 6, Fig. 4, confines the free edge of the flange 7 in the slotted portion 11 throughout the forming operation. This effectively controls the forces tending to create buckles and causes the material to be wiped free of wrinkles over the radius at the lower edge. The portion or flange 7 withdrawn from slot 11 passes between the vertical face of plate 9 and the face 8 of die 4 through space 13 which is gauged to the thickness of flange 7. The draw form clip is particularly effective in forming open and closed flanges of either the shrink of stretch type flanges. An example of an open and closed angle flange is given in Fig. 5 wherein the draw form clip 6 moves parallel to face 8 of forming die 4 at an angle of bend of flange 7 in accordance with the angle of slope of cam or guide block 14. An end view in elevation of guide block 14, Fig. 5, is shown in enlarged detail in Fig. 6.

Figure 7:
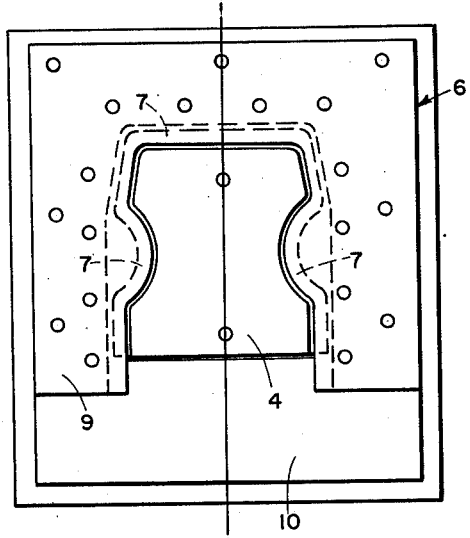
Fig. 7 is a modified type of draw form clip for forming flanges on three sides of a part.
Figure 8:
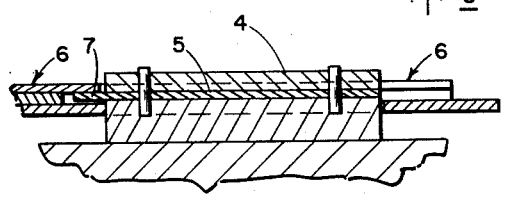
Fig. 8 is a section on line 8—8 of Fig. 7 showing loading slot for draw form clip.

Another modified type of draw form clip 6 is given in Fig. 7, showing a type suitable for forming a curved flange on three sides of a sheet metal part. Fig. 8 is a sectional view of draw form clip 6 and forming die 4 taken on line 8—8 of Fig. 7.

Therefore, in view of the foregoing, the present invention takes into account the inherent limitation of sheet metal formed or drawn in the curved section and provides a means for controlling the flow of metal so as to eliminate the accumulation of excess materials resulting in wrinkles in shrink type flanges, as well as to prevent the building up of stresses in the outer edges of sheet metal blanks tending to tear or crack the sensitive edges of stretch type flanges.

Although the invention has been described and illustrated in detail it is to be clearly understood that the same is by way of illustration and ex-

We claim:

1. Means for forming flanges on a blank comprising a bed; a die having an edge of a predetermined contour, said die being disposed on said bed and adapted to support a blank thereon at a predetermined distance above said bed with a portion of said blank overhanging said die edge; a substantially flat relatively broad clip having a slot in a first edge thereof adapted to receive said overhanging portion of such a blank whereby said clip is suspended from said blank in spaced relationship with said bed, said clip having a thickness below said slot relatively small with respect to said predetermined distance at which said blank is supported above said bed, said edge of said clip below said slot being complementary to said die edge and above said slot being spaced from said die edge by a distance substantially equal to the thickness of said blank; and resilient means for exerting a downward force on said clip for initially moving said outer edge thereof into engagement with said bed whereby said clip is inclined with respect to said bed and said resilient means exerts a horizontal component of force urging said clip against said die edge, and to subsequently move said first edge of said clip downwardly along said die edge for wiping said overhanging portion of said blank against said die edge while maintaining said outer edge of said clip in engagement with said press bed.

2. In combination with a press having a bed and a platen movable with respect thereto, and provided with a resilient pad thereon, a die on said bed having a face of predetermined contour, said die including means to support a blank thereon at a predetermined distance above said bed with one side portion thereof overhanging said die face, substantially flat clip having a slot therein adapted to receive the overhanging portion of such a blank whereby said clip is suspended from said side of said blank in spaced relationship with said bed with a free unsupported outer edge, said clip below said slot being complementary to said die face and of a thickness less than said predetermined height at which said blank is supported, and above said slot having an edge spaced from said die face by a distance substantially equal to the thickness of said blank, whereby when said platen is moved with respect to said bed said free unsupported outer edge of said clip is moved thereby into engagement with said bed and said resilient pad exerts a horizontal component of force urging said clip against said die face, and subsequently moves said opposite edge of said clip downwardly along said die face for wiping said overhanging portion of said blank against said die face, while said outer edge is maintained in engagement with said press bed.

3. Means for forming flanges on a blank comprising a bed; a die having an edge of predetermined contour on said bed, said die including means to support a blank thereon at a predetermined height above said bed with one side portion thereof overhanging said die edge; a substantially flat relatively broad clip having a slot in a first edge adapted to receive the overhanging portion of such a blank whereby said clip is suspended from said side of said blank in spaced relationship with said bed, said edge of said clip below said slot being complementary to said die edge and above said slot being spaced from said die edge by a distance substantially equal to the thickness of said blank, said clip being of a thickness below said slot less than said predetermined height; and resilient means for exerting a downward force on said clip thereby to initially move the edge of said clip opposite said first edge into engagement with said bed whereby said clip is inclined with respect to said bed and said resilient means exerts a horizontal component of force urging said clip against said die edge, and to subsequently move the said first edge of said clip downwardly along said die edge for wiping said overhanging portion of said blank against said die edge.

References Cited in the file of this patent

UNITED STATES PATENTS

| Number | Name | Date |
| --- | --- | --- |
| 2,339,032 | Schlenzig | Jan. 11, 1944 |
| 2,348,998 | Pease | May 16, 1944 |
| 2,354,005 | Flowers | July 18, 1944 |
| 2,400,004 | Jager | May 7, 1946 |
| 2,410,676 | Nielsen | Nov. 5, 1946 |

FOREIGN PATENTS

| Number | Country | Date |
| --- | --- | --- |
| 569,773 | Great Britain | June 7, 1945 |